(12) United States Patent
Ikushima et al.

(10) Patent No.: US 9,248,741 B2
(45) Date of Patent: Feb. 2, 2016

(54) TORQUE INDICATING DEVICE AND VEHICLE INCLUDING SAME

(71) Applicants: Yoshihiro Ikushima, Okazaki (JP); Satoshi Shimizu, Toyota (JP)

(72) Inventors: Yoshihiro Ikushima, Okazaki (JP); Satoshi Shimizu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/440,434

(22) PCT Filed: Nov. 20, 2012

(86) PCT No.: PCT/JP2012/080104
§ 371 (c)(1),
(2) Date: May 4, 2015

(87) PCT Pub. No.: WO2014/080459
PCT Pub. Date: May 30, 2014

(65) Prior Publication Data
US 2015/0336457 A1    Nov. 26, 2015

(51) Int. Cl.
| | |
|---|---|
| *B60K 17/348* | (2006.01) |
| *B60K 35/00* | (2006.01) |
| *B60K 23/08* | (2006.01) |
| *B60W 30/02* | (2012.01) |
| *B60W 10/119* | (2012.01) |
| *B60K 17/346* | (2006.01) |

(Continued)

(52) U.S. Cl.
CPC ................ *B60K 35/00* (2013.01); *B60K 17/34* (2013.01); *B60K 17/348* (2013.01); *B60K 17/3462* (2013.01); *B60K 17/354* (2013.01); *B60K 23/0808* (2013.01); *B60W 10/119* (2013.01); *B60W 30/025* (2013.01); *B60K 2350/352* (2013.01); *B60W 2520/30* (2013.01); *B60W 2710/105* (2013.01); *B60W 2720/30* (2013.01); *F16H 2200/0017* (2013.01); *Y02T 10/56* (2013.01)

(58) Field of Classification Search
CPC .. B60K 17/348; B60K 23/0808; B60K 17/34; B60K 17/3462; B60K 17/354; B60W 10/119; B60W 30/025; B60W 2520/30; B60W 2710/105; B60W 2720/30; F16H 2200/0017; Y02T 10/56
USPC ............ 701/87, 88, 89; 180/233, 248; 477/35
See application file for complete search history.

(56) References Cited

U.S. PATENT DOCUMENTS

| | | | | | |
|---|---|---|---|---|---|
| 5,219,038 | A | * | 6/1993 | Hamada | B60K 23/0808 180/197 |
| 5,609,219 | A | * | 3/1997 | Watson | B60K 17/342 180/197 |
| 5,704,444 | A | * | 1/1998 | Showalter | B60K 23/0808 180/197 |

(Continued)

FOREIGN PATENT DOCUMENTS

| | | |
|---|---|---|
| JP | S62-47430 U | 3/1987 |
| JP | S62-178228 U | 11/1987 |

(Continued)

*Primary Examiner* — Russell Frejd
(74) *Attorney, Agent, or Firm* — Oliff PLC

(57) ABSTRACT

Disclosed is a torque indicating device including: a first indicating section that indicates a torque transmitted to primary drive wheels of a vehicle; and a second indicating section that indicates a torque transmitted to secondary drive wheels of the vehicle. The second indicating section indicates a quantity that is less than or equal to the quantity indicated by the first indicating section.

4 Claims, 13 Drawing Sheets

(51) Int. Cl.
*B60K 17/354* (2006.01)
*B60K 17/34* (2006.01)

(56) References Cited

U.S. PATENT DOCUMENTS

| | | | | |
|---|---|---|---|---|
| 5,740,877 A | * | 4/1998 | Sasaki | B60K 23/0808 180/248 |
| 5,803,197 A | * | 9/1998 | Hara | B60K 23/0808 180/248 |
| 6,105,702 A | * | 8/2000 | Showalter | B60K 23/0808 180/247 |
| 6,263,995 B1 | * | 7/2001 | Watson | B60K 17/342 180/248 |
| 6,842,681 B2 | * | 1/2005 | Imai | B60K 23/0808 180/197 |
| 6,907,953 B2 | * | 6/2005 | Shigeta | B60K 23/0808 180/245 |
| 7,497,297 B2 | * | 3/2009 | Watson | B60K 17/342 180/248 |
| 2009/0030572 A1 | | 1/2009 | Takahashi et al. | |
| 2011/0137531 A1 | * | 6/2011 | Noguchi | B60K 23/0808 701/54 |
| 2012/0203416 A1 | * | 8/2012 | Yoshimura | B60K 6/445 701/22 |

FOREIGN PATENT DOCUMENTS

| | | |
|---|---|---|
| JP | S63-32031 U | 3/1988 |
| JP | S64-27615 U | 2/1989 |
| JP | 4 471 132 B2 | 6/2010 |
| JP | 2011-046362 A | 3/2011 |

\* cited by examiner

Front-wheel-segment-turn-on Map (Mf1)

Flag List Associated with Map

| Fseg5 | 0 | 0 | 0 | 0 | 0 | 1 |
| Fseg4 | 0 | 0 | 0 | 0 | 1 | 1 |
| Fseg3 | 0 | 0 | 0 | 1 | 1 | 1 |
| Fseg2 | 0 | 0 | 1 | 1 | 1 | 1 |
| Fseg1 | 1 ※ | 1 | 1 | 1 | 1 | 1 |

※ If Tfm > 0, Fseg1 = 1.
If Tfm = 0, Fseg1 to Fseg5 = 1.

Rear-wheel-segment-turn-on Map (Mr1)

Flag List Associated with Map

| Rseg5 | 0 | 0 | 0 | 0 | 0 | 1 |
| Rseg4 | 0 | 0 | 0 | 0 | 1 | 1 |
| Rseg3 | 0 | 0 | 0 | 1 | 1 | 1 |
| Rseg2 | 0 | 0 | 1 | 1 | 1 | 1 |
| Rseg1 | 0 ※ | 1 | 1 | 1 | 1 | 1 |

※ In low torque region, Rseg1 = 0 even when Tfm > 0.
If Tfm = 0, Rseg1 to Rseg5 = 1.

Flag List Associated with Map

| Rseg5 | 0 | 0 | 0 | 0 | 0 | 1 |
| Rseg4 | 0 | 0 | 0 | 0 | 1 | 1 |
| Rseg3 | 0 | 0 | 0 | 1 | 1 | 1 |
| Rseg2 | 0 | 0 | 1 | 1 | 1 | 1 |
| Rseg1 | 0 ※ | 1 | 1 | 1 | 1 | 1 |

※ In low torque region, Rseg1 = 0 even when Tfm > 0.
If Tfm = 0, Rseg1 to Rseg5 = 1.

TORQUE INDICATING DEVICE AND VEHICLE INCLUDING SAME

TECHNICAL FIELD

The present invention relates to torque indicating devices that indicate torques placed on primary drive wheels and secondary drive wheels and to vehicles including such a torque indicating device.

BACKGROUND ART

Conventional four-wheel-drive vehicles are known that include clutch means to distribute driving force between front wheels and rear wheels (see, for example, Patent Document 1).

The four-wheel-drive vehicle disclosed in Patent Document 1 includes driving force distribution indicating means that indicates distribution of driving force between front wheels and rear wheels.

CITATION LIST

Patent Literature

Patent Document 1: Japanese Utility Model Publication, Jitsukaisho, No. 62-47430

SUMMARY OF THE INVENTION

Problems to be Solved by the Invention

The driving force distribution indicating means could be applied to, for example, a four-wheel-drive vehicle in which travel driving force is transferred primarily to the front wheels (primary drive wheels) and auxiliary to the rear wheels (secondary drive wheels). In that application, the user (driver) may have a sense of strangeness if the driving force for the rear wheels is indicated to be greater than the driving force for the front wheels.

The present invention, conceived in order to address this problem, has an object of providing a torque indicating device capable of reducing the aforementioned sense of strangeness felt by the user and a vehicle including the torque indicating device.

Solution to Problem

A torque indicating device in accordance with the present invention includes: a first indicating section that indicates a torque transmitted to a primary drive wheel of a vehicle; and a second indicating section that indicates a torque transmitted to a secondary drive wheel of the vehicle, wherein the second indicating section indicates a quantity that is less than or equal to a quantity indicated by the first indicating section. The primary drive wheel is a wheel to which travel driving force (torque) is primarily transmitted. The secondary drive wheel is a wheel to which travel driving force is auxiliary transmitted.

This configuration restrains the indicated quantity of the torque on the secondary drive wheel from increasing in excess of the indicated quantity of the torque on the primary drive wheel, thereby reducing the aforementioned sense of strangeness felt by the user.

In the torque indicating device mentioned above, the quantity indicated by the first indicating section may be varied with a variation in the torque transmitted to the primary drive wheel, the quantity indicated by the second indicating section may be varied with a variation in the torque transmitted to the secondary drive wheel, and the quantity indicated by the second indicating section may have an upper limit that is, when either one or both of the quantity indicated by the first indicating section and the quantity indicated by the second indicating section is/are to be varied, controlled not to exceed the quantity indicated by the first indicating section, so that the quantity indicated by the second indicating section is less than or equal to the quantity indicated by the first indicating section.

In the torque indicating device mentioned above, the quantity indicated by the first indicating section may be varied with a variation in the torque transmitted to the primary drive wheel, the quantity indicated by the second indicating section may be varied with a variation in the torque transmitted to the secondary drive wheel, and when either one or both of the quantity indicated by the first indicating section and the quantity indicated by the second indicating section is/are to be varied, control may be performed to prohibit the quantity indicated by the second indicating section from exceeding the quantity indicated by the first indicating section, so that the quantity indicated by the second indicating section is less than or equal to the quantity indicated by the first indicating section.

In the torque indicating device mentioned above, the quantity indicated by the first indicating section may be derived from a ratio of the torque on the primary drive wheel to a total torque that is a sum of the torque on the primary drive wheel and the torque on the secondary drive wheel, and the quantity indicated by the second indicating section may be derived from a ratio of the torque on the secondary drive wheel to the total torque.

In the last case, the ratio of the torque on the primary drive wheel to the total torque and the ratio of the torque on the secondary drive wheel to the total torque may each have a maximum value that is set to 0.5, and a map-referencing criterion torque may be calculated from the torque on the secondary drive wheel; a primary-drive-wheel-map-referencing torque may be calculated from the ratio of the torque on the primary drive wheel to the total torque and the map-referencing criterion torque, and the quantity indicated by the first indicating section may be derived using the primary-drive-wheel-map-referencing torque; and a secondary-drive-wheel-map-referencing torque may be calculated from the ratio of the torque on the secondary drive wheel to the total torque and the map-referencing criterion torque, and the quantity indicated by the second indicating section may be derived using the secondary-drive-wheel-map-referencing torque.

A vehicle in accordance with the present invention includes any one of the torque indicating devices mentioned above.

Advantageous Effects of the Invention

The torque indicating device and vehicle in accordance with the present invention reduce the aforementioned sense of strangeness felt by the user.

BRIEF DESCRIPTION OF DRAWINGS

FIG. 8 is a diagrammatic illustration of an example of the torque indicator screen in FIG. 4 in which some indicators are ON.

FIG. 9 is a diagrammatic illustration of an example of the torque indicator screen in FIG. 4 in which some indicators are ON.

FIG. 10 is a diagrammatic illustration of an example of the torque indicator screen in FIG. 4 in which some indicators are ON.

DESCRIPTION OF EMBODIMENTS

The following will describe embodiments of the present invention in reference to drawings. Throughout the following, it is assumed, as an example, that the present invention is applied to a vehicle that employs a standby four-wheel drive system based on an FF (front-engine, front-wheel drive) layout.

First Embodiment

First will be described an overall structure of a vehicle 100 in accordance with the first embodiment of the present invention in reference to FIGS. 1 to 3.

The vehicle 100 is a conventional vehicle including an engine 1 as its sole travel driving force source and is capable of switching between two-wheel drive where only front wheels 43L and 43R are driven and four-wheel drive where all front wheels 43L and 43R and rear wheels 73L and 73R are driven. The front wheels 43L and 43R are wheels to which a major portion of travel driving force is transmitted and are examples of the "primary drive wheel" of the present invention. The rear wheels 73L and 73R are wheels to which the remaining minor portion of the travel driving force is transmitted and are examples of the "secondary drive wheel" of the present invention.

Figure 1:
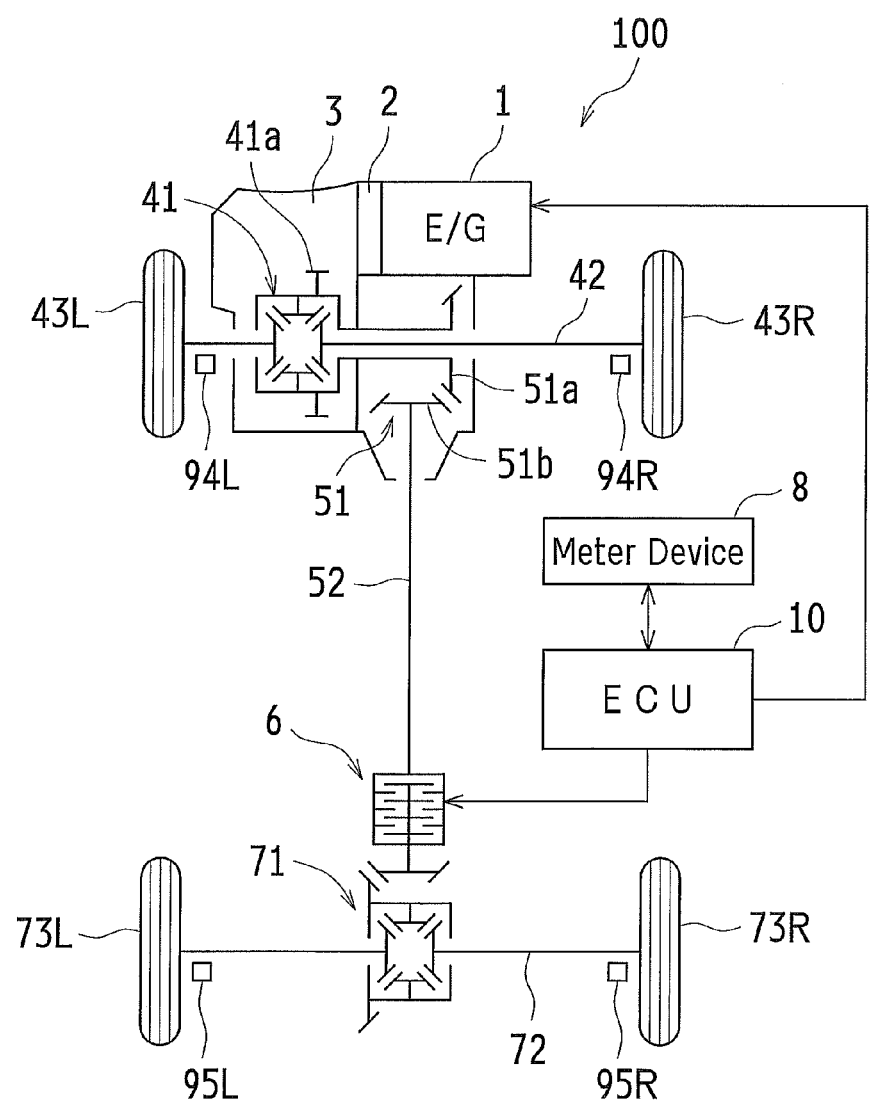
FIG. 1 is a schematic diagram representing a power transmission system for a vehicle in accordance with a first embodiment of the present invention.

As illustrated in FIG. 1, the vehicle 100 includes the engine (internal combustion engine) 1 that generates travel driving force, a torque converter 2, a transmission 3, a front-wheel differential device 41, a front-wheel shaft (front-wheel drive shaft) 42, the front wheels 43L and 43R, a transfer 51, a propeller shaft 52, an electronically controlled coupling 6, a rear-wheel differential device 71, a rear-wheel shaft (rear-wheel drive shaft) 72, the rear wheels 73L and 73R, a meter device 8, and an ECU 10.

Engine

The engine 1 may be a gasoline engine, a diesel engine, or any other publicly known power unit that combusts fuel to generate power for output. The engine 1 is, for example, capable of controlling operating state, such as the throttle opening degree of a throttle valve (not shown) disposed on an intake air path (opening degree according to which intake air quantity is regulated), a fuel injection quantity, and an ignition timing (for a gasoline engine).

Torque Converter, Transmission, & Related Components

The torque converter 2 includes, among others, a pump impeller on its input side and a turbine runner on its output side and transfers power between the pump impeller and the turbine runner using a fluid (hydraulic oil) as a medium. The pump impeller is coupled to a crankshaft (not shown) that is the output shaft of the engine 1. The turbine runner is coupled to the input shaft of the transmission 3 via a turbine shaft.

The transmission 3 is a stepped automatic transmission that shifts gears using frictional engaging devices, such as a clutch and a brake, and a planetary gear device. The transmission 3 may be a belt-type continuously variable transmission (CVT) or any other type of CVT that steplessly regulates the gear ratio. The transmission 3 may alternatively be a manual transmission.

An output gear (not shown) is coupled to the output shaft of the transmission 3 in such a manner that the output gear can rotate integrally with the output shaft. This output gear is meshed with a differential driven gear 41a of the front-wheel differential device 41. The driving force transmitted to the output shaft of the transmission 3 is transmitted to the left and right front wheels 43L and 43R via the front-wheel differential device 41 and the front-wheel shaft 42. The rotational speeds of the left and right front wheels 43L and 43R are detected respectively by a left-front-wheel-speed sensor 94L and a right-front-wheel-speed sensor 94R.

Transfer & Related Components

The transfer 51 includes a drive gear 51a and a driven gear 51b and is provided to change the direction in which the torque is transmitted from the widthwise direction of the vehicle to the direction toward the back of the vehicle body. The drive gear 51a is coupled to the front-wheel differential device 41 in such a manner that the drive gear 51a can rotate integrally with the front-wheel differential device 41. The driven gear 51b is meshed with the drive gear 51a. The propeller shaft 52 is coupled to the driven gear 51b in such a manner that the propeller shaft 52 can rotate integrally with the driven gear 51b. The propeller shaft 52 is coupled to the left and right rear wheels 73L and 73R via the electronically controlled coupling 6, the rear-wheel differential device 71, and the rear-wheel shaft 72. The driving force transmitted from the front-wheel differential device 41 to the transfer 51 is transmitted to the propeller shaft 52 and the electronically controlled coupling 6. The driving force is then transmitted (distributed) to the left and right rear wheels 73L and 73R via the rear-wheel differential device 71 and the rear-wheel shaft 72 when the electronically controlled coupling 6 is engaged (thus able to transmit coupling torque). The rotational speeds of the left and right rear wheels 73L and 73R are detected respectively by a left-rear-wheel-speed sensor 95L and a right-rear-wheel-speed sensor 95R.

Electronically Controlled Coupling

The electronically controlled coupling 6 is a device, for example of a pilot clutch type, that distributes driving force. The electronically controlled coupling 6 includes, for example, a main clutch, a pilot clutch (electromagnetic multiple-disc clutch), a cam mechanism, and an electromagnet. The main clutch is composed of a multiple-disc friction clutch. The electronically controlled coupling 6 engages the pilot clutch by the electromagnetic force of the electromagnet, thereby transferring the engaging force to the main clutch via the cam mechanism, which in turn engages the main clutch.

The torque capacity, i.e., coupling torque Tc, of the electronically controlled coupling 6 is controlled through control of the excitation current Ie supplied to the electromagnet. The electronically controlled coupling 6 hence enables stepless regulation of the ratio of the driving force distributed to the rear wheels 73L and 73R with respect to the total driving force ("driving force distribution ratio") within the range of, for example, 0 to 50%. The ECU 10 controls the excitation current Ie supplied to the electromagnet of the electronically controlled coupling 6.

Figure 3:
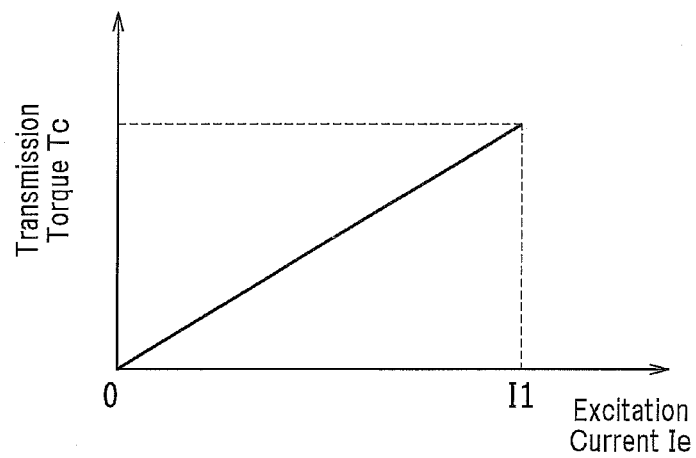
FIG. 3 is a graphical representation of a relationship between the excitation current supplied to the electronically controlled coupling shown in FIG. 1 and the torque transmitted by the electronically controlled coupling ("transmission torque").

FIG. 3 represents a relationship between the excitation current Ie supplied to the electromagnet of the electronically controlled coupling 6 and the transmission torque (coupling torque) Tc of the electronically controlled coupling 6. As shown in FIG. 3, the transmission torque Tc of the electronically controlled coupling 6 is variably controllable through the excitation current Ie which is an actuator operation amount.

For example, when zero excitation current Ie is supplied to the electronically controlled coupling 6, the main clutch is disengaged (disconnected), and the transmission ratio of the transmission torque Tc is 0%. A traveling state is therefore achieved that is equivalent to front-wheel drive (two-wheel drive by means of front wheels). An increase in the excitation current Ie for the electronically controlled coupling 6 causes an increase in the transmission torque Tc. Referring to FIG. 3, when the excitation current Ie is equal to I1, the transmission ratio of the transmission torque Tc is 100% (the driving force distribution ratio is 50%). A traveling state is therefore achieved that is equivalent to direct four-wheel drive in which a maximum portion of the driving force is distributed to the rear wheels 73L and 73R. The driving force distribution between the front and rear wheels is thus variably controllable through the excitation current Ie for the electronically controlled coupling 6.

ECU

The ECU 10 is an electronic control unit that, for example, controls the operation of the engine 1 and includes, for example, a CPU (central processing unit), a ROM (read-only memory), a RAM (random access memory), and a backup RAM.

The ROM stores, for example, various control programs and maps referenced in executing the control programs. The CPU executes computation based on the various control programs and maps stored in the ROM. The RAM is a memory that temporarily stores results of computation carried out by the CPU, data inputs from sensors, etc. The backup RAM is a non-volatile memory that stores, for example, data that should be saved when the engine 1 is stopped.

Figure 2:
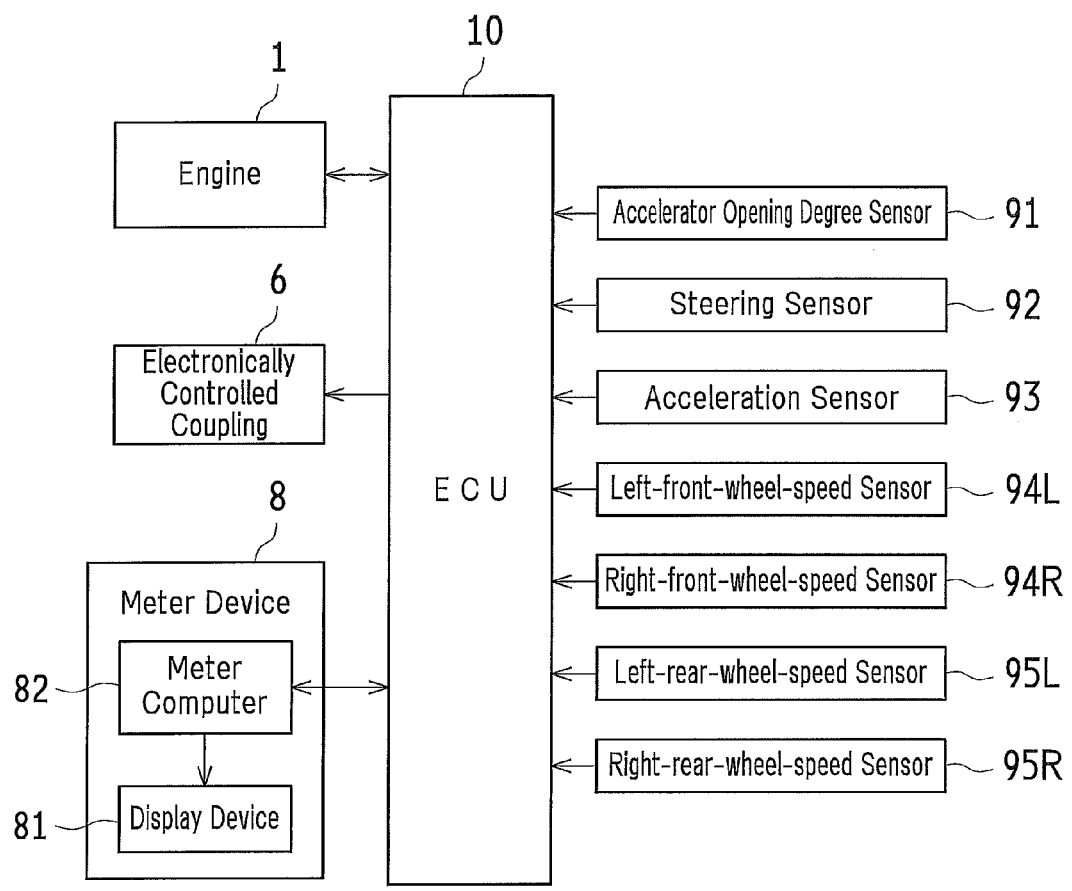
FIG. 2 is a block diagram schematically representing the structure of a control system for the vehicle shown in FIG. 1.

As illustrated in FIG. 2, the ECU 10 is connected to, among others, an accelerator opening degree sensor 91, a steering sensor 92, an acceleration sensor 93, a left-front-wheel-speed sensor 94L, a right-front-wheel-speed sensor 94R, a left-rear-wheel-speed sensor 95L, and a right-rear-wheel-speed sensor 95R. The accelerator opening degree sensor 91 detects an amount by which the accelerator pedal is depressed ("accelerator opening degree"). The steering sensor 92 detects the steering angle of the steering wheels. The acceleration sensor 93 detects the acceleration of the vehicle 100. The left-front-wheel-speed sensor 94L detects the rotational speed (revolutions per unit time) of the left front wheel 43L. The right-front-wheel-speed sensor 94R detects the rotational speed of the right front wheel 43R. The left-rear-wheel-speed sensor 95L detects the rotational speed of the left rear wheel 73L. The right-rear-wheel-speed sensor 95R detects the rotational speed of the right rear wheel 73R. The ECU 10 is connected also to, among others, a water temperature sensor, a throttle opening degree sensor, and an air flow meter. The water temperature sensor detects the temperature of engine cooling water. The throttle opening degree sensor detects the opening degree of a throttle valve disposed on the intake air path. The air flow meter detects the intake air quantity. The ECU 10 receives signals from these sensors.

The ECU 10 executes various control processes, including throttle opening degree control (intake air quantity control), fuel injection quantity control, and ignition timing control, for the engine 1 based on output signals of the various sensors. The ECU 10 also controls the electronically controlled coupling 6 to control switching between two-wheel drive and four-wheel drive (which were mentioned earlier). The ECU 10 is capable of communications with the meter device 8 that displays (indicates) various information so that the ECU 10 can send various display requests to the meter device 8.

Control while Traveling

Next will be described an example of control of the vehicle 100 in accordance with the first embodiment while the vehicle 100 is traveling.

For example, the vehicle 100, upon accelerating from a standstill, is switched to four-wheel drive to distribute travel driving force to the front and rear wheels according to the distribution of the vehicle weight. This process reduces slippage and improves standing-start performance.

The vehicle 100, during steady-state driving, is switched to two-wheel drive to ensure straight traveling stability and acceleration performance. If slippage occurs, the vehicle 100 is switched to four-wheel drive to distribute driving force to the rear wheels 73L and 73R to ensure traveling stability.

To make a normal turn for example, the vehicle 100 distributes in advance driving force to the rear wheels 73L and 73R according to steering angle and driving force. This process improves turning capability in an initial stage of making a turn.

The vehicle 100 is switched to four-wheel drive when the user selects four-wheel drive mode on a 2WD/4WD selection switch located in the passenger compartment.

In this manner, the vehicle 100 in accordance with the first embodiment is switched, where needed, to two-wheel drive or four-wheel drive according to traveling state by the electronically controlled coupling 6 that is under the control of the ECU 10.

Meter Device

Next will be described the meter device 8 disposed in the vehicle 100 in accordance with the first embodiment in reference to FIGS. 2 and 4. The meter device 8 is an example of the "torque indicating device" in accordance with the present invention.

As illustrated in FIG. 2, the meter device 8 includes a display device 81 that displays (indicates) various information and a meter computer 82 that controls the meter device 8. The meter device 8 has a function to display (indicate) the torque transmitted to the front wheels 43L and 43R and the torque transmitted to the rear wheels 73L and 73R when the vehicle 100 is in four-wheel drive.

Figure 4:
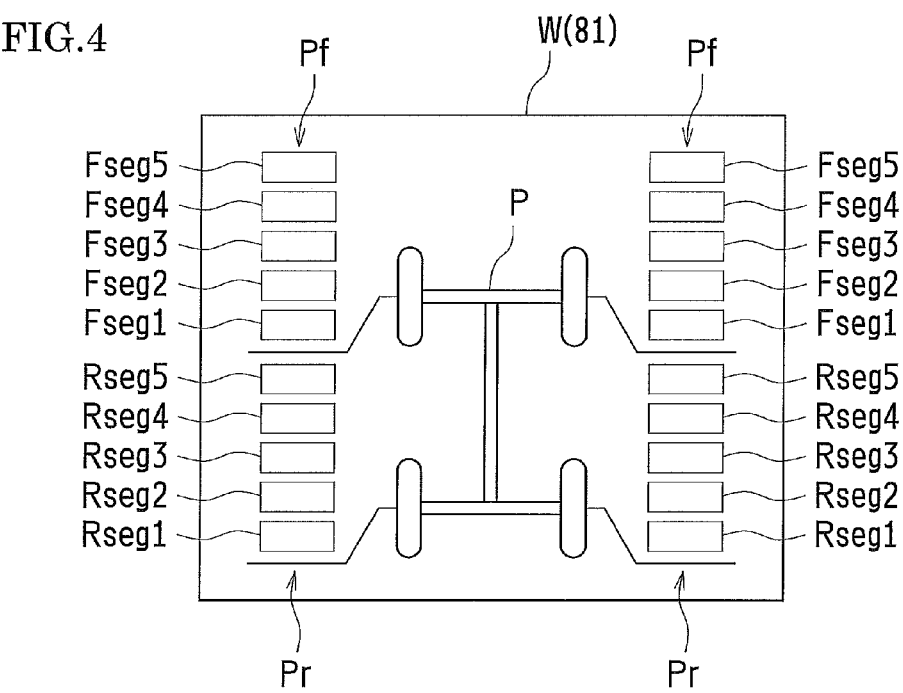
FIG. 4 is a diagrammatic illustration of a torque indicator screen displayed on a display device in the meter device shown in FIG. 2.

Specifically, the meter device 8, in four-wheel drive, is capable of displaying a torque indicator screen W on the display device 81 as shown in FIG. 4. This exemplary torque indicator screen W shows at its center a vehicle drawing P that illustratively represents a drive system. There are provided indicators Pf beside the front wheels in the vehicle drawing P to indicate the torque on the front wheels 43L and 43R. There are also provided indicators Pr beside the rear wheels in the vehicle drawing P to indicate the torque on the rear wheels 73L and 73R. The indicators Pf and Pr are examples of the "first indicating section" and the "second indicating section" respectively in accordance with the present invention.

Each indicator Pf is composed of segments Fseg1 to Fseg5 that are turned on/off to indicate an increase/decrease in torque by increasing/decreasing the number of ON segments out of the five segments Fseg1 to Fseg5. The segments Fseg1 to Fseg5 are arranged in this order from the bottom upward. Indications of the indicators Pf disregard any differences between the torque on the left wheels and the torque on the right wheels; the same number of segments are turned on in the left and right segments Fseg1 to Fseg5.

Each indicator Pr is composed of segments Rseg1 to Rseg5 that are turned on/off to indicate an increase/decrease in torque by increasing/decreasing the number of ON segments out of the five segments Rseg1 to Rseg5. The segments Rseg1 to Rseg5 are arranged in this order from the bottom upward. Indications of the indicators Pr disregard any differences between the torque on the left wheels and the torque on the right wheels; the same number of segments are turned on in the left and right segments Rseg1 to Rseg5.

In the meter device 8 in accordance with the first embodiment, the indicators Pf and Pr have the same number of segments, and the number of ON segments ("indicated quantity" or "indicated magnitude") out of the segments Rseg1 to Rseg5 in the indicators Pr is always less than or equal to the number of ON segments out of the segments Fseg1 to Fseg5 in the indicators Pf. In other words, the quantity (magnitude) of the torque on the rear wheels 73L and 73R indicated by the indicators Pr is always less than or equal to the quantity (magnitude) of the torque on the front wheels 43L and 43R indicated by the indicators Pf. The indicators Pf and Pr on the meter device 8 are turned on according to a turn-on request from the ECU 10 (see FIG. 2). The following will describe a turn-on control process for the indicators Pf and Pr.

Indicator-Turn-On Control

Figure 5:
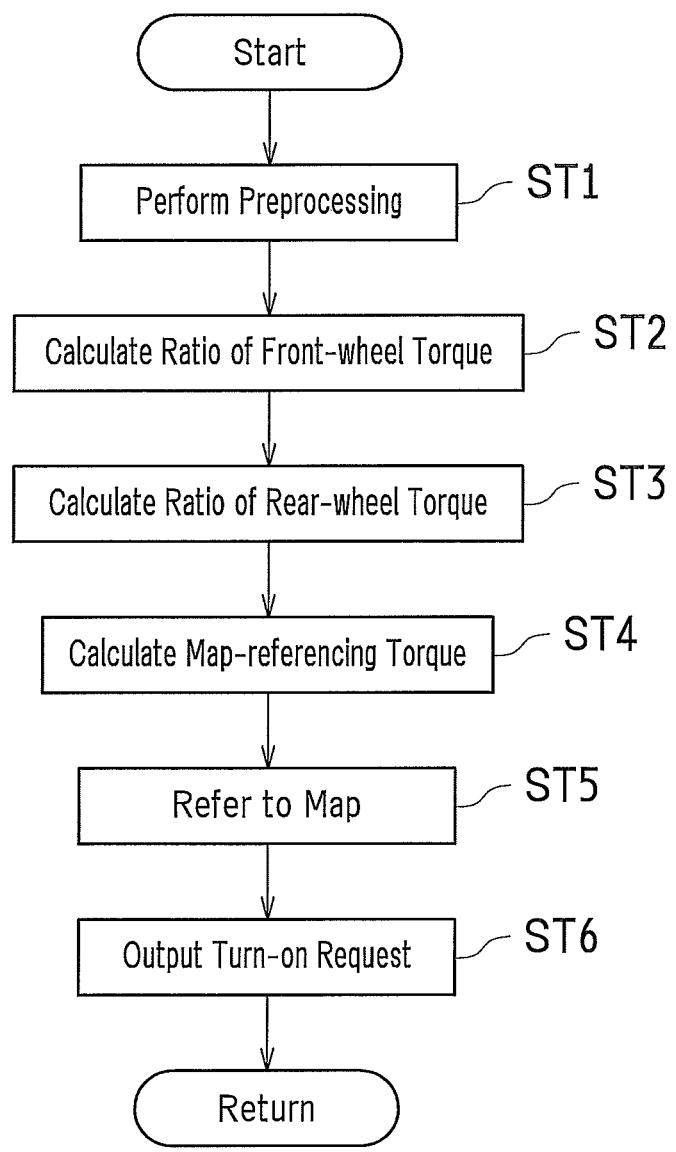
FIG. 5 is a flow chart depicting indicator-turn-on control in the vehicle shown in FIG. 1.
Figure 6:
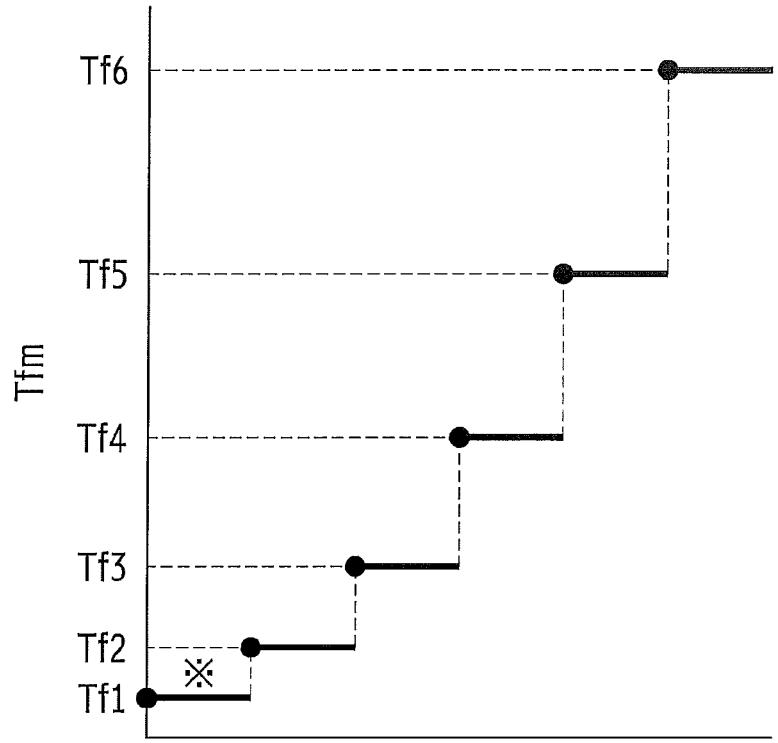
FIG. 6 shows, as an example, a front-wheel-segment-turn-on map and a flag list associated with the map, both in accordance with the first embodiment.
Figure 7:
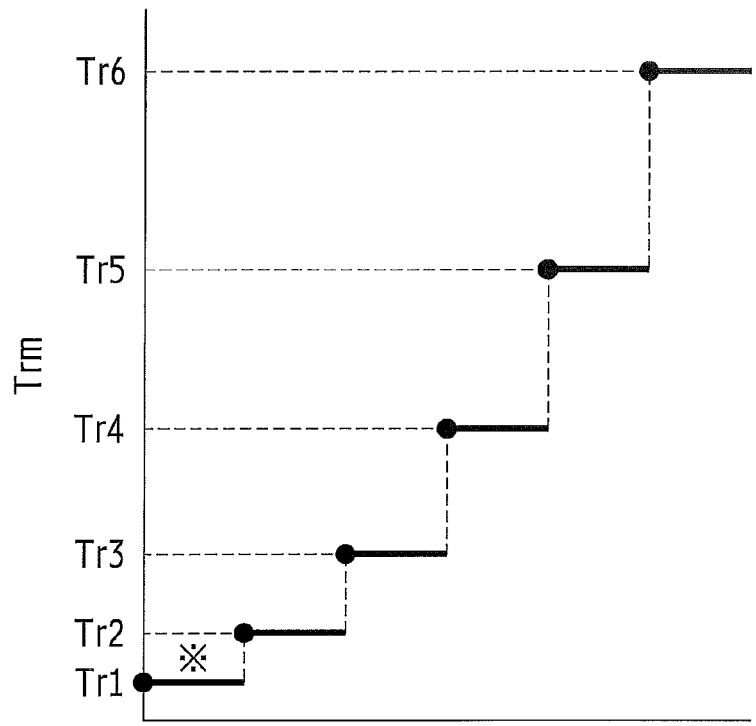
FIG. 7 shows, as an example, a rear-wheel-segment-turn-on map and a flag list associated with the map, both in accordance with the first embodiment.

FIG. 5 is a flow chart depicting an indicator-turn-on control process in the vehicle. FIG. 6 shows, as an example, a front-wheel-segment-turn-on map and a flag list associated with the map. FIG. 7 shows, as an example, a rear-wheel-segment-turn-on map and a flag list associated with the map. Next will be described a turn-on control process for the indicators Pf and Pr in the vehicle 100 in reference to FIGS. 5 to 7. The turn-on control process for the indicators Pf and Pr described in the following is repeatedly performed at predetermined time intervals (e.g., every 60 ms) while the vehicle 100 is in four-wheel drive. The steps in FIG. 5 are implemented by the ECU 10.

Step ST1

Referring to FIG. 5, first, preprocessing is performed in step ST1. The preprocessing defines a front- and rear-wheel sum torque Tin (input torque to the entire drive system) and a rear-wheel torque Tout (output torque to the rear-wheel side of the drive system). The front- and rear-wheel sum torque Tin and the rear-wheel torque Tout are determined according to traveling state of the vehicle 100 that are evaluated based on output signals from the various sensors and other information.

Step ST2

Next, the ratio Tf_% of a front-wheel torque to the front- and rear-wheel sum torque is calculated. Specifically, first, a front-wheel torque Tf is calculated from equation (1) below.

$$Tf = Tin - Tout \quad (1)$$

The ratio Tf_% of the front-wheel torque is then calculated from equation (2) below.

$$Tf\_\% = Tf/Tin \quad (2)$$

The ratio Tf_% of the front-wheel torque is used to calculate a front-wheel-map-referencing torque Tfm (details will be given later). The maximum value of the ratio Tf_% is set to 0.5. Therefore, if the calculation from equation (2) produces a result that is greater than or equal to 0.5, the ratio Tf_% of the front-wheel torque is set to 0.5. Meanwhile, if the front- and rear-wheel sum torque Tin is less than or equal to 0, the ratio Tf_% of the front-wheel torque is set to 0.

In other words, in step ST2, the front-wheel torque Tf is calculated by subtracting the rear-wheel torque Tout from the front- and rear-wheel sum torque Tin, and the ratio Tf_% of the front-wheel torque is calculated by dividing the front-wheel torque Tf by the front- and rear-wheel sum torque Tin. If the calculations produce a result that is greater than or equal to 0.5, the ratio Tf_% of the front-wheel torque is set to 0.5.

Step ST3

Next, the ratio Tr_% of the rear-wheel torque to the front- and rear-wheel sum torque is calculated. Specifically, first, a rear-wheel torque Tr is calculated from equation (3) below.

$$Tr = Tout \quad (3)$$

The ratio Tr_% of the rear-wheel torque is then calculated from equation (4) below.

$$Tr\_\% = Tr/Tin \quad (4)$$

The ratio Tr_% of the rear-wheel torque is used to calculate a rear-wheel-map-referencing torque Trm (details will be given later). The maximum value of the ratio Tr_% is set to 0.5. Therefore, if the calculation from equation (4) produces a result that is greater than or equal to 0.5, the ratio Tr_% of the rear-wheel torque is set to 0.5. Meanwhile, if the front- and rear-wheel sum torque Tin is less than or equal to 0, the ratio Tr_% of the rear-wheel torque is set to 0.

In other words, in step ST3, the rear-wheel torque Tr is set equal to the rear-wheel torque Tout, and the ratio Tr_% of the rear-wheel torque is calculated by dividing the rear-wheel torque Tr by the front- and rear-wheel sum torque Tin. If the calculations produce a result that is greater than or equal to 0.5, the ratio Tr_% of the rear-wheel torque is set to 0.5.

Step ST4

Next, a map-referencing torque is calculated. Specifically, first, a map-referencing criterion torque Tmap is calculated from equation (5) below.

$$Tmap = 2 \times Tr \quad (5)$$

The front-wheel-map-referencing torque Tfm and the rear-wheel-map-referencing torque Trm are then calculated respectively from equations (6) and (7) below.

$$Tfm = Tmap \times Tf\_\% \quad (6)$$

$$Trm = Tmap \times Tr\_\% \quad (7)$$

In other words, in step ST4, the rear-wheel torque Tr is doubled to calculate the map-referencing criterion torque Tmap, the map-referencing criterion torque Tmap is multiplied by the ratio Tf_% of the front-wheel torque to calculate the front-wheel-map-referencing torque Tfm, and the map-referencing criterion torque Tmap is multiplied by the ratio Tr_% of the rear-wheel torque to calculate the rear-wheel-map-referencing torque Trm. This calculation of the map-referencing criterion torque Tmap from the rear-wheel torque Tr matches the scale of the front-wheel-map-referencing torque Tfm and the scale of the rear-wheel-map-referencing torque Trm, that is, adjusts a maximum value Tf6 of the front-wheel-map-referencing torque Tfm (see FIG. 6) and a maximum value Tr6 of the rear-wheel-map-referencing torque Trm (see FIG. 7) so that the maximum values Tf6 and Tr6 match the torque capacity Trmax of the rear wheels.
Step ST5

A front-wheel-segment-turn-on map Mf1 (see FIG. 6) is then referenced using the front-wheel-map-referencing torque Tfm to determine which of the segments Fseg1 to Fseg5 are to be turned on in the indicators Pf. A rear-wheel-segment-turn-on map Mr1 (see FIG. 7) is also referenced using the rear-wheel-map-referencing torque Trm to determine which of the segments Rseg1 to Rseg5 are to be turned on in the indicators Pr.

The front-wheel-segment-turn-on map Mf1 and the flag list associated with the map, both shown in FIG. 6, are stored in the ROM in the ECU 10. The rear-wheel-segment-turn-on map Mr1 and the flag list associated with the map, both shown in FIG. 7, are stored in the ROM in the ECU 10. In the flag lists in FIGS. 6 and 7, a "0" represents a non-turn-on request, and a "1" represents a turn-on request.

In the exemplary front-wheel-segment-turn-on map Mf1 shown in FIG. 6, when the front-wheel-map-referencing torque Tfm is 0, the flags for the segments Fseg1 to Fseg5 are all "0". When the front-wheel-map-referencing torque Tfm is greater than 0 and less than or equal to a threshold value Tf2, the flag for the segment Fseg1 is "1", and the flags for the segments Fseg2 to Fseg5 are "0".

When the front-wheel-map-referencing torque Tfm is greater than the threshold value Tf2 and less than or equal to a threshold value Tf3, the flags for the segments Fseg1 and Fseg2 are "1", and the flags for the segments Fseg3 to Fseg5 are "0". When the front-wheel-map-referencing torque Tfm is greater than the threshold value Tf3 and less than or equal to a threshold value Tf4, the flags for the segments Fseg1 to Fseg3 are "1", and the flags for the segments Fseg4 and Fseg5 are "0".

When the front-wheel-map-referencing torque Tfm is greater than the threshold value Tf4 and less than or equal to a threshold value Tf5, the flags for the segments Fseg1 to Fseg4 are "1", and the flag for the segment Fseg5 is "0". When the front-wheel-map-referencing torque Tfm is greater than the threshold value Tf5 and less than or equal to the maximum value Tf6 (torque capacity Trmax of the rear wheels), the flags for the segments Fseg1 to Fseg5 are all "1".

The front-wheel-segment-turn-on map Mf1 is non-linear and designed so that the number of segments that are requested to be turned on is progressively unlikely to increase as the front-wheel-map-referencing torque Tfm increases, except the segment Fseg1. In other words, the number of segments that are requested to be turned on is more likely to change when the front-wheel-map-referencing torque Tfm is relatively small than when it is relatively large, except the segment Fseg1. The front-wheel-segment-turn-on map Mf1 is designed also so that the segment Fseg1 is requested to be turned on when the front-wheel-map-referencing torque Tfm is in a low torque region (greater than "0" and less than or equal to the threshold value Tf1), which differs from the rear-wheel-segment-turn-on map Mr1 (details will be given later).

In the exemplary rear-wheel-segment-turn-on map Mr1 shown in FIG. 7, when the rear-wheel-map-referencing torque Trm is greater than 0 and less than or equal to a threshold value Tr1, the flags for the segments Rseg1 to Rseg5 are all "0". When the rear-wheel-map-referencing torque Trm is greater than the threshold value Tr1 and less than or equal to a threshold value Tr2, the flag for the segment Rseg1 is "1", and the flags for the segments Rseg2 to Rseg5 are "0".

When the rear-wheel-map-referencing torque Trm is greater than the threshold value Tr2 and less than or equal to a threshold value Tr3, the flags for the segments Rseg1 and Rseg2 are "1", and the flags for the segments Rseg3 to Rseg5 are "0". When the rear-wheel-map-referencing torque Trm is greater than the threshold value Tr3 and less than or equal to a threshold value Tr4, the flags for the segments Rseg1 to Rseg3 are "1", and the flags for the segments Rseg4 and Rseg5 are "0".

When the rear-wheel-map-referencing torque Trm is greater than the threshold value Tr4 and less than or equal to a threshold value Tr5, the flags for the segments Rseg1 to Rseg4 are "1", and the flag for the segment Rseg5 is "0". When the rear-wheel-map-referencing torque Trm is greater than the threshold value Tr5 and less than or equal to the maximum value Tr6 (torque capacity Trmax of the rear wheels), the flags for the segments Rseg1 to Rseg5 are all "1".

The rear-wheel-segment-turn-on map Mr1 is non-linear and designed so that the number of segments that are requested to be turned on is progressively unlikely to increase as the rear-wheel-map-referencing torque Trm increases. In other words, the number of segments that are requested to be turned on is more likely to change when the rear-wheel-map-referencing torque Trm is relatively small than when it is relatively large. The rear-wheel-segment-turn-on map Mr1 is designed also so that none of the segments Rseg1 to Rseg5 is requested to be turned on when the rear-wheel-map-referencing torque Trm is in a low torque region (greater than 0 and less than or equal to the threshold value Tr1), which differs from the front-wheel-segment-turn-on map Mf1.

For example, the threshold values Tr1, Tr2, Tr3, Tr4, and Tr5 and maximum value Tr6 of the rear-wheel-map-referencing torque Trm are set equal to the threshold values Tf1, Tf2, Tf3, Tf4, and Tf5 and maximum value Tf6 of the front-wheel-map-referencing torque Tfm respectively.
Step ST6

Next, the ECU 10 outputs an turn-on request to the meter device 8. In response to the turn-on request, the meter device 8 turns on an appropriate one(s) of the segments Fseg1 to Fseg5 in the indicators Pf and an appropriate one(s) of the segments Rseg1 to Rseg5 in the indicators Pr.
Example of Indicator-Turn-On Control being Performed Next will be described an example of an indicator-turn-on control process being performed in reference to FIGS. 5 to 10. In the following, it is assumed, as an example, that the net driving force (torque capable of being fed to the entire drive system) is 3,000 Nm and also that the torque capacity Trmax of the rear wheels is 1,000 Nm. It is also assumed that in the front-wheel-segment-turn-on map Mf1 and the rear-wheel-segment-turn-on map Mr1, the threshold values Tf1 and Tr1 are 60 Nm, the threshold values Tf2 and Tr2 are 130 Nm, the threshold values Tf3 and Tr3 are 250 Nm, the threshold values Tf4 and Tr4 are 450 Nm, the threshold values Tf5 and Tr5 are 700 Nm, and the maximum values Tf6 and Tr6 are 1,000 Nm.
Assume Front-Wheel Torque=20 Nm, Rear-Wheel Torque=20 Nm Referring to FIG. 5, first, in step ST1, the front- and rear-wheel sum torque Tin is defined to be 40 Nm, and the rear-wheel torque Tout is defined to be 20 Nm.

Next, in step ST2, the ratio Tf_% of the front-wheel torque to the front- and rear-wheel sum torque is calculated using equations (1) and (2) mentioned earlier.

$Tf=40-20=20$ Nm $Tf\_\%=20/40=0.5$

Next, in step ST3, the ratio Tr_% of the rear-wheel torque to the front- and rear-wheel sum torque is calculated using equations (3) and (4) mentioned earlier.

$Tr=20$ Nm $Tr\_\%=20/40=0.5$

Next, in step ST4, the front-wheel-map-referencing torque Tfm and the rear-wheel-map-referencing torque Trm are calculated using equations (5) to (7) mentioned earlier.

$T\text{map}=2\times20=40$ Nm $Tfm=40\times0.5=20\text{Nm}$ $Trm=40\times0.5=20$ Nm Next, in step ST5, the front-wheel-segment-turn-on map Mf1 (see FIG. 6) is referenced using the front-wheel-map-referencing torque Tfm, and the rear-wheel-segment-turn-on map Mr1 (see FIG. 7) is referenced using the rear-wheel-map-referencing torque Trm.

Then, because the front-wheel-map-referencing torque Tfm is greater than 0 and less than or equal to the threshold value Tf2 (e.g., 130 Nm), the flag for the segment Fseg1 is "1", and the flags for the segments Fseg2 to Fseg5 are "0". Meanwhile, because the rear-wheel-map-referencing torque Trm is greater than 0 and less than or equal to the threshold value Tr1 (e.g., 60 Nm), the flags for the segments Rseg1 to Rseg5 are all "0".

Figure 8:
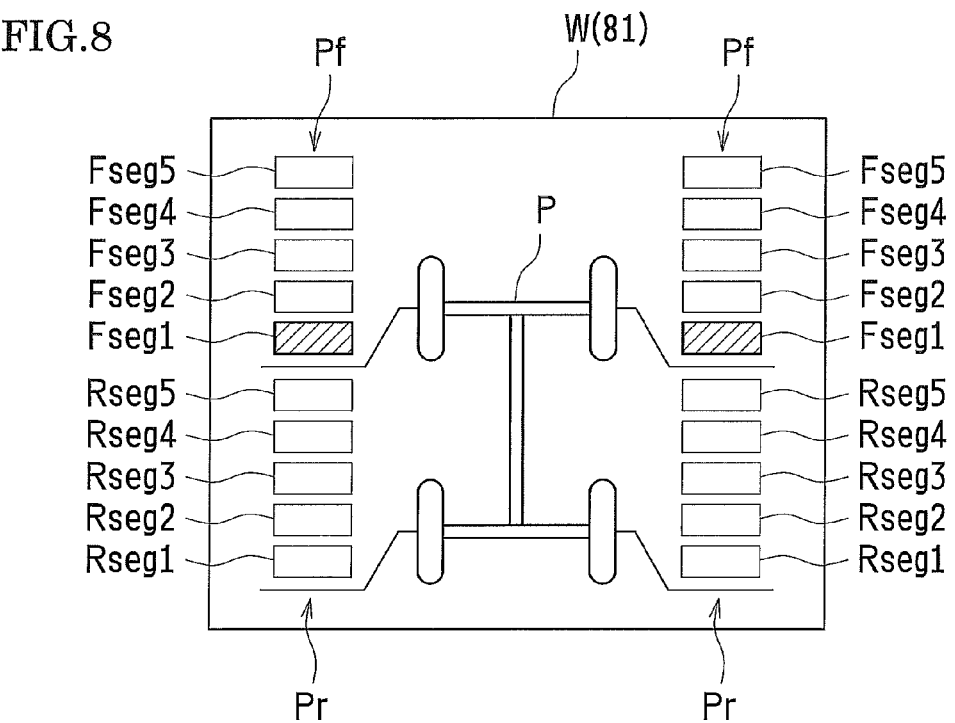

Next, in step ST6, the ECU 10 outputs to the meter device 8 a turn-on request for only the segments Fseg1 in the indicators Pf. Then, on the torque indicator screen W, only the segments Fseg1 are turned on as illustrated in FIG. 8. In FIG. 8, hatching indicates that the segments Fseg1 are ON. One segment is ON in each indicator Pf, whereas no segment is ON in the indicators Pr.

Assume Front-Wheel Torque=400 Nm, Rear-Wheel Torque=400 Nm

Referring to FIG. 5, first, in step ST1, the front- and rear-wheel sum torque Tin is defined to be 800 Nm, and the rear-wheel torque Tout is defined to be 400 Nm.

Next, in step ST2, the ratio Tf_% of the front-wheel torque to the front- and rear-wheel sum torque is calculated using equations (1) and (2) mentioned earlier.

$Tf=800-400=400$ Nm $Tf\_\%=400/800=0.5$

Next, in step ST3, the ratio Tr_% of the rear-wheel torque to the front- and rear-wheel sum torque is calculated using equations (3) and (4) mentioned earlier.

$Tr=400$ Nm $Tr\_\%=400/800=0.5$

Next, in step ST4, the front-wheel-map-referencing torque Tfm and the rear-wheel-map-referencing torque Trm are calculated using equations (5) to (7) mentioned earlier.

$T\text{map}=2\times400=800$ Nm $Tfm=800\times0.5=400$ Nm $Trm=800\times0.5=400$ Nm Next, in step ST5, the front-wheel-segment-turn-on map Mf1 (see FIG. 6) is referenced using the front-wheel-map-referencing torque Tfm, and the rear-wheel-segment-turn-on map Mr1 (see FIG. 7) is referenced using the rear-wheel-map-referencing torque Trm.

Then, because the front-wheel-map-referencing torque Tfm is greater than the threshold value Tf3 (e.g., 250 Nm) and less than or equal to the threshold value Tf4 (e.g., 450 Nm), the flags for the segments Fseg1 to Fseg3 are "1", and the flags for the segments Fseg4 and Fseg5 are "0". Meanwhile, because the rear-wheel-map-referencing torque Trm is greater than the threshold value Tr3 (e.g., 250 Nm) and less than or equal to the threshold value Tr4 (e.g., 450 Nm), the flags for the segments Rseg1 to Rseg3 are "1", and the flags for the segments Rseg4 and Rseg5 are "0".

Figure 9:
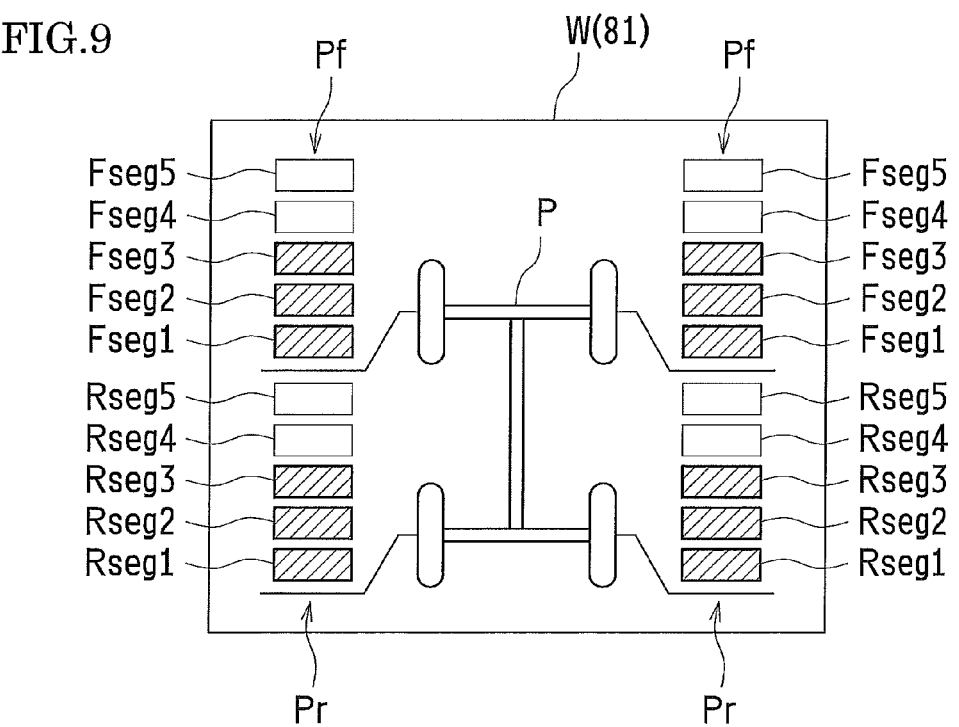

Next, in step ST6, the ECU 10 outputs to the meter device 8 a turn-on request for the segments Fseg1 to Fseg3 in the indicators Pf and the segments Rseg1 to Rseg3 in the indicators Pr. Then, on the torque indicator screen W, the segments Fseg1 to Fseg3 and Rseg1 to Rseg3 are turned on as illustrated in FIG. 9. In FIG. 9, hatching indicates that the segments Fseg1 to Fseg3 and Rseg1 to Rseg3 are ON. Three segments are ON in each of the indicators Pf and Pr.

Assume Front-Wheel Torque=2,000 Nm, Rear-Wheel Torque=500 Nm

Referring to FIG. 5, first, in step ST1, the front- and rear-wheel sum torque Tin is defined to be 2,500 Nm, and the rear-wheel torque Tout is defined to be 500 Nm.

Next, in step ST2, the ratio Tf_% of the front-wheel torque to the front- and rear-wheel sum torque is calculated using equations (1) and (2) mentioned earlier.

$Tf=2,500-500=2,000$ Nm $Tf\_\%=2,000/2,500=0.8$

Because the maximum value of the ratio Tf_% of the front-wheel torque is set to 0.5, it follows that Tf_%=0.5.

Next, in step ST3, the ratio Tr_% of the rear-wheel torque to the front- and rear-wheel sum torque is calculated using equations (3) and (4) mentioned earlier.

$Tr=500$ Nm $Tr\_\%=500/2,500=0.2$

Next, in step ST4, the front-wheel-map-referencing torque Tfm and the rear-wheel-map-referencing torque Trm are calculated using equations (5) to (7) mentioned earlier.

$T\text{map}=2\times500=1,000$ Nm $Tfm=1,000\times0.5=500$ Nm $Trm=1,000\times0.2=200$ Nm Next, in step ST5, the front-wheel-segment-turn-on map Mf1 (see FIG. 6) is referenced using the front-wheel-map-referencing torque Tfm, and the rear-wheel-segment-turn-on map Mr1 (see FIG. 7) is referenced using the rear-wheel-map-referencing torque Trm.

Then, because the front-wheel-map-referencing torque Tfm is greater than the threshold value Tf4 (e.g., 450 Nm) and less than or equal to the threshold value Tf5 (e.g., 700 Nm), the flags for the segments Fseg1 to Fseg4 are "1", and the flag for the segment Fseg5 is "0". Meanwhile, because the rearwheel-map-referencing torque Trm is greater than the threshold value Tr2 (e.g., 130 Nm) and less than or equal to the threshold value Tr3 (e.g., 250 Nm), the flags for the segments Rseg1 and Rseg2 are "1", and the flags for the segments Rseg3 to Rseg5 are "0".

Figure 10:
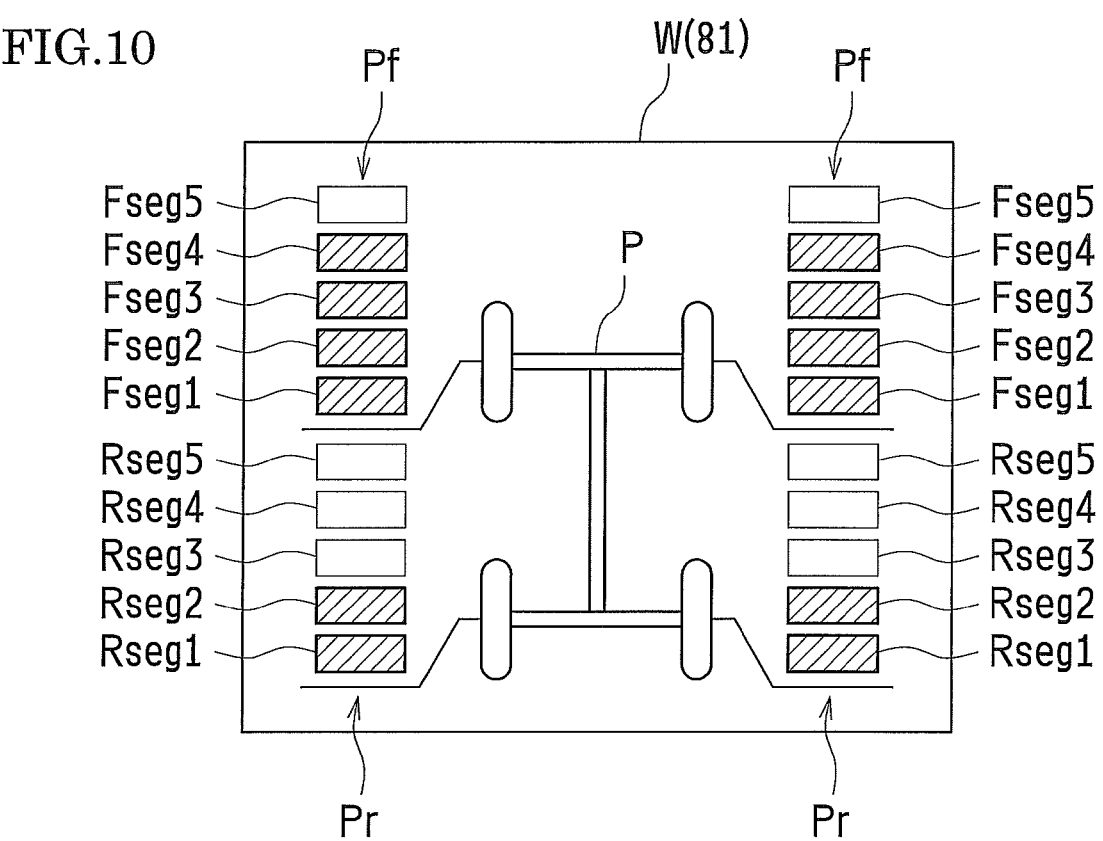

Next, in step ST6, the ECU 10 outputs to the meter device 8 a turn-on request for the segments Fseg1 to Fseg4 in the indicators Pf and the segments Rseg1 and Rseg2 in the indicators Pr. Then, on the torque indicator screen W, the segments Fseg1 to Fseg4, Rseg1, and Rseg2 are turned on as illustrated in FIG. 10. In FIG. 10, hatching indicates that the segments Fseg1 to Fseg4, Rseg1, and Rseg2 are ON. Four segments are ON in each indicator Pf, whereas two segments are ON in each indicator Pr.

Effects

In the first embodiment, the number of ON segments in the indicators Pr is less than or equal to the number of ON segments in the indicators Pf as described above. This configuration prohibits the indicated quantity (magnitude) of the torque on the rear wheels 73L and 73R (the number of ON segments) from increasing in excess of the indicated quantity (magnitude) of the torque on the front wheels 43L and 43R in the FF-layout-based vehicle 100. The configuration thus reduces sense of strangeness felt by the user.

In the first embodiment, the number of segments to be turned on in the indicators Pf is derived from the ratio Tf_% of the front-wheel torque to the front- and rear-wheel sum torque, whereas the number of segments to be turned on in the indicators Pr is derived from the ratio Tr_% of the rear-wheel torque to the front- and rear-wheel sum torque. This configuration prevents the number of ON segments in the indicators Pr from increasing in excess of the number of ON segments in the indicators Pf and at the same time restrains the indicated quantities (magnitudes) of the torques that are transmitted to the front and rear wheels from deviating from the actual quantities (magnitudes) of those torques.

In the first embodiment, the maximum values of the ratio Tf_% of the front-wheel torque and the ratio Tr_% of the rear-wheel torque are set to 0.5, and the rear-wheel torque Tr is doubled to calculate the map-referencing criterion torque Tmap. Then, the front-wheel-map-referencing torque Tfm is calculated from the map-referencing criterion torque Tmap and the ratio Tf_% of the front-wheel torque, and the rear-wheel-map-referencing torque Trm is calculated from the map-referencing criterion torque Tmap and the ratio Tr_% of the rear-wheel torque. This configuration adjusts the maximum value Tf6 of the front-wheel-map-referencing torque Tfm (see FIG. 6) and the maximum value Tr6 of the rear-wheel-map-referencing torque Trm (see FIG. 7) so that the maximum values Tf6 and Tr6 match the torque capacity Trmax of the rear wheels.

Variation Examples of First Embodiment

Figure 11:
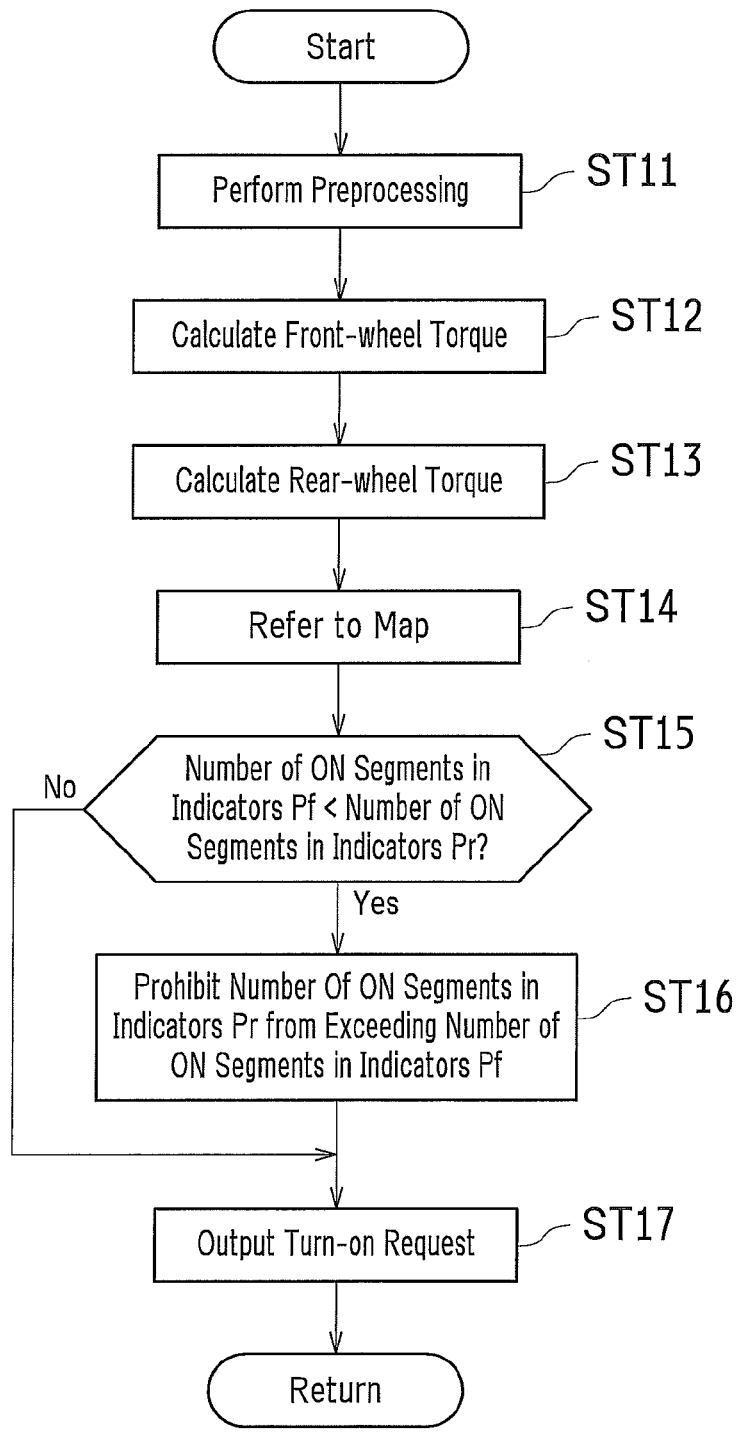
FIG. 11 is a flow chart depicting indicator-turn-on control in accordance with a variation example of the first embodiment.
Figure 12:
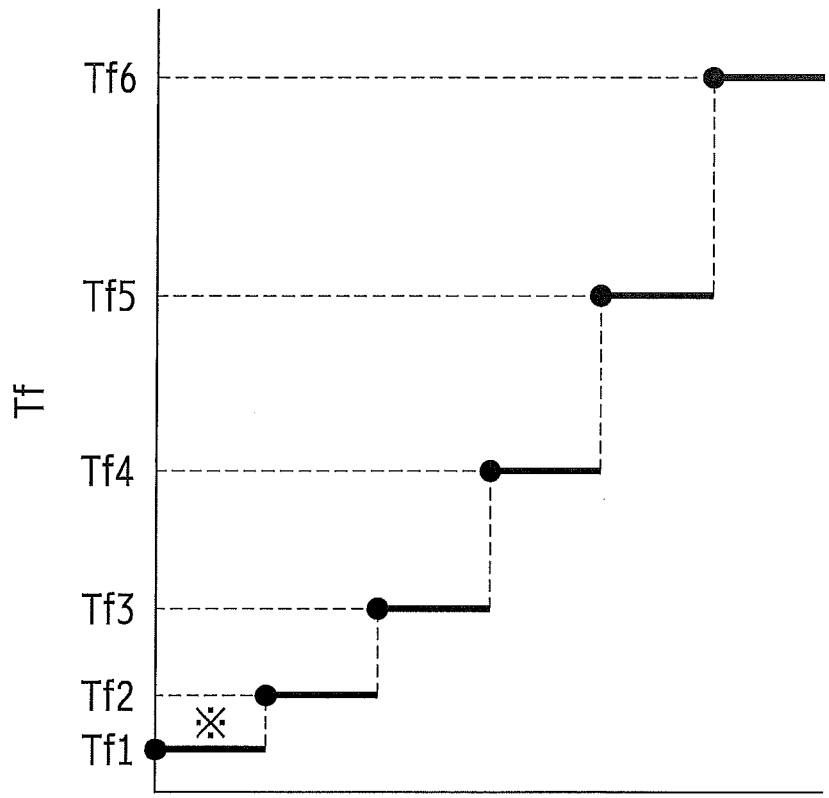
FIG. 12 shows, as an example, a front-wheel-segment-turn-on map and a flag list associated with the map, both in accordance with the variation example of the first embodiment.
Figure 13:
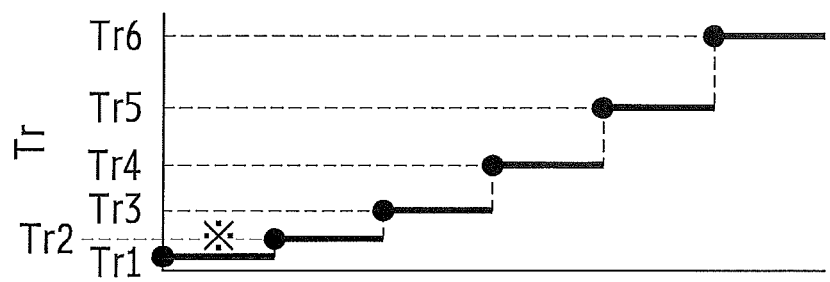
FIG. 13 shows, as an example, a rear-wheel-segment-turn-on map and a flag list associated with the map, both in accordance with the variation example of the first embodiment.

FIG. 11 is a flow chart depicting an indicator-turn-on control process in accordance with a variation example of the first embodiment. FIG. 12 shows, as an example, a front-wheel-segment-turn-on map and a flag list associated with the map. FIG. 13 shows, as an example, a rear-wheel-segment-turn-on map and a flag list associated with the map.

Next will be described a turn-on control process for the indicators Pf and Pr in accordance with a variation example of the first embodiment in reference to FIGS. 11 to 13. This variation example of the first embodiment differs from the first embodiment above in the turn-on control process for the indicators Pf and Pr, but otherwise is the same as the first embodiment. Redundant description will be omitted. The turn-on control process for the indicators Pf and Pr described in the following is repeatedly performed at predetermined time intervals (e.g., every 60 ms) while the vehicle 100 is in four-wheel drive. The steps in FIG. 11 are implemented by the ECU 10.

Step ST11

Referring to FIG. 11, first, preprocessing is performed in step ST11. The preprocessing defines a front- and rear-wheel sum torque Tin (input torque to the entire drive system) and a rear-wheel torque Tout (output torque to the rear-wheel side of the drive system). The front- and rear-wheel sum torque Tin and the rear-wheel torque Tout are determined according to traveling state of the vehicle 100 that are evaluated based on output signals from the various sensors and other information.

Step ST12

Next, the front-wheel torque Tf is calculated from equation (8) below.

$$Tf = Tin - Tout \tag{8}$$

In other words, in step ST12, the front-wheel torque Tf is calculated by subtracting the rear-wheel torque Tout from the front- and rear-wheel sum torque Tin.

Step ST13

Next, the rear-wheel torque Tr is calculated from equation (9) below.

$$Tr = Tout \tag{9}$$

In other words, in step ST13, the rear-wheel torque Tr is set equal to the rear-wheel torque Tout.

Step ST14

Then, a front-wheel-segment-turn-on map Mf2 (see FIG. 12) is referenced using the front-wheel torque Tf to derive the number of segments to be turned on in the indicators Pf. A rear-wheel-segment-turn-on map Mr2 (see FIG. 13) is also referenced using the rear-wheel torque Tr to derive the number of segments to be turned on in the indicators Pr.

The front-wheel-segment-turn-on map Mf2 and the flag list associated with the map, both shown in FIG. 12, are stored in the ROM in the ECU 10. The rear-wheel-segment-turn-on map Mr2 and the flag list associated with the map, both shown in FIG. 13, are stored in the ROM in the ECU 10. In the flag lists in FIGS. 12 and 13, a "0" represents a non-turn-on request, and a "1" represents a turn-on request.

In the current variation example of the first embodiment, the scale on the vertical axis is smaller in the rear-wheel-segment-turn-on map Mr2 than in the front-wheel-segment-turn-on map Mf2 because the torque capacity Trmax of the rear wheels is smaller than the torque capacity Tfmax of the front wheels. For example, if the torque capacity Trmax of the rear wheels is one third of the torque capacity Tfmax of the front wheels, the scale on the vertical axis in the rear-wheel-segment-turn-on map Mr2 is specified one third as large as the scale on the vertical axis in the front-wheel-segment-turn-on map Mf2.

In the exemplary front-wheel-segment-turn-on map Mf2 shown in FIG. 12, when the front-wheel torque Tf is 0, the flags for the segments Fseg1 to Fseg5 are all "0". When the front-wheel torque Tf is greater than 0 and less than or equal to the threshold value Tf2, the flag for the segment Fseg1 is "1", and the flags for the segments Fseg2 to Fseg5 are "0".

When the front-wheel torque Tf is greater than the threshold value Tf2 and less than or equal to the threshold value Tf3, the flags for the segments Fseg1 and Fseg2 are "1", and the flags for the segments Fseg3 to Fseg5 are "0". When the front-wheel torque Tf is greater than the threshold value Tf3 and less than or equal to the threshold value Tf4, the flags for the segments Fseg1 to Fseg3 are "1", and the flags for the segments Fseg4 and Fseg5 are "0".

When the front-wheel torque Tf is greater than the threshold value Tf4 and less than or equal to the threshold value Tf5, the flags for the segments Fseg1 to Fseg4 are "1", and the flag for the segment Fseg5 is "0". When the front-wheel torque Tf is greater than the threshold value Tf5 and less than or equal to the maximum value Tf6 (torque capacity Tfmax of the front wheels), the flags for the segments Fseg1 to Fseg5 are all "1".

The front-wheel-segment-turn-on map Mf2 is non-linear and designed so that the number of segments that are requested to be turned on is progressively unlikely to increase as the front-wheel torque Tf increases, except the segment Fseg1. In other words, the number of segments that are requested to be turned on is more likely to change when the front-wheel torque Tf is relatively small than when it is relatively large, except the segment Fseg1. The front-wheel-segment-turn-on map Mf2 is designed also so that the segment Fseg1 is requested to be turned on when the front-wheel torque Tf is in a low torque region (greater than 0 and less than or equal to the threshold value Tf1), which differs from the rear-wheel-segment-turn-on map Mr2 (details will be given later).

In the exemplary rear-wheel-segment-turn-on map Mr2 shown in FIG. 13, when the rear-wheel torque Tr is greater than 0 and less than or equal to the threshold value Tr1, the flags for the segments Rseg1 to Rseg5 are all "0". When the rear-wheel torque Tr is greater than the threshold value Tr1 and less than or equal to the threshold value Tr2, the flag for the segment Rseg1 is "1", and the flags for the segments Rseg2 to Rseg5 are "0".

When the rear-wheel torque Tr is greater than the threshold value Tr2 and less than or equal to the threshold value Tr3, the flags for the segments Rseg1 and Rseg2 are "1", and the flags for the segments Rseg3 to Rseg5 are "0". When the rear-wheel torque Tr is greater than the threshold value Tr3 and less than or equal to the threshold value Tr4, the flags for the segments Rseg1 to Rseg3 are "1", and the flags for the segments Rseg4 and Rseg5 are "0".

When the rear-wheel torque Tr is greater than the threshold value Tr4 and less than or equal to the threshold value Tr5, the flags for the segments Rseg1 to Rseg4 are "1", and the flag for the segment Rseg5 is "0". When the rear-wheel torque Tr is greater than the threshold value Tr5 and less than or equal to the maximum value Tr6 (torque capacity Trmax of the rear wheels), the flags for the segments Rseg1 to Rseg5 are all "1".

The rear-wheel-segment-turn-on map Mr2 is non-linear and designed so that the number of segments that are requested to be turned on is progressively unlikely to increase as the rear-wheel torque Tr increases. In other words, the number of segments that are requested to be turned on is more likely to change when the rear-wheel torque Tr is relatively small than when it is relatively large. The rear-wheel-segment-turn-on map Mr2 is designed also so that none of the segments Rseg1 to Rseg5 is requested to be turned on when the rear-wheel torque Tr is in a low torque region (greater than 0 and less than or equal to the threshold value Tr1), which differs from the front-wheel-segment-turn-on map Mf2.

For example, the threshold values Tr1, Tr2, Tr3, Tr4, and Tr5 and maximum value Tr6 of the rear-wheel torque Tr are set to one third of the threshold values Tf1, Tf2, Tf3, Tf4, and Tf5 and maximum value Tf6 of the front-wheel torque Tf respectively.

Step ST15

Next, it is determined whether or not the number of segments to be turned on in the indicators Pr that is derived from the rear-wheel-segment-turn-on map Mr2 exceeds the number of segments to be turned on in the indicators Pf that is derived from the front-wheel-segment-turn-on map Mf2. If it is determined that the number of segments to be turned on in the indicators Pr exceeds the number of segments to be turned on in the indicators Pf, the process proceeds to step ST16. On the other hand, if it is determined that the number of segments to be turned on in the indicators Pr does not exceed the number of segments to be turned on in the indicators Pf, the process proceeds to step ST17.

Step ST16

The number of segments to be turned on in the indicators Pr is prohibited from exceeding the number of segments to be turned on in the indicators Pf before the process proceeds to step ST17. For example, if the front-wheel-segment-turn-on map Mf2, when referenced, dictates that three segments be turned on in each indicator Pf, whereas the rear-wheel-segment-turn-on map Mr2, when referenced, dictates four segments be turned on in each indicator Pr, the number of segments to be turned on in each indicator Pr is reset to three. The maximum number of ON segments in each indicator Pr may be controlled to be less than or equal to the number of ON segments in each indicator Pf.

Step ST17

Next, the ECU 10 outputs a turn-on request to the meter device 8. In response to the turn-on request, the meter device 8 turns on an appropriate one(s) of the segments Fseg1 to Fseg5 in the indicators Pf and an appropriate one(s) of the segments Rseg1 to Rseg5 in the indicators Pr.

Effects

In this variation example of the first embodiment, as described above, the number of ON segments in the indicators Pf is increased/decreased with an increase/decrease in the front-wheel torque Tf, the number of ON segments in the indicators Pr is increased/decreased with an increase/decrease in the rear-wheel torque Tr, and the number of ON segments in the indicators Pr is prohibited from exceeding the number of ON segments in the indicators Pf. In this configuration, the number of ON segments in the indicators Pr is readily maintained to be less than or equal to the number of ON segments in the indicators Pf. Similar effects are achieved by controlling the maximum number of ON segments in each indicator Pr to be less than or equal to the number of ON segments in each indicator Pf.

The variation example of the first embodiment have other effects that are similar to those achieved by the first embodiment.

Second Embodiment

Figure 14:
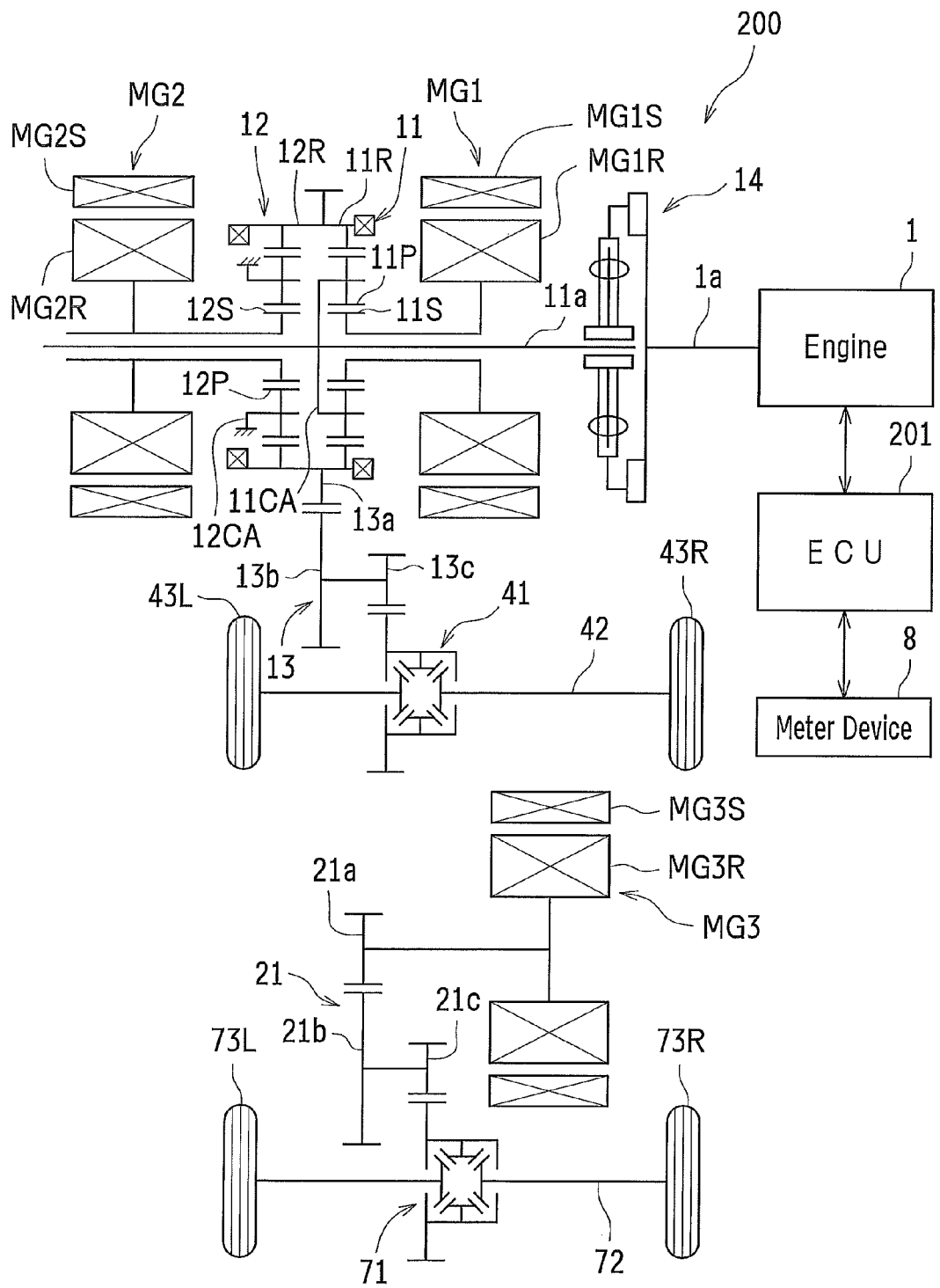
FIG. 14 is a schematic diagram representing a power transmission system for a vehicle in accordance with a second embodiment of the present invention.
Figure 15:
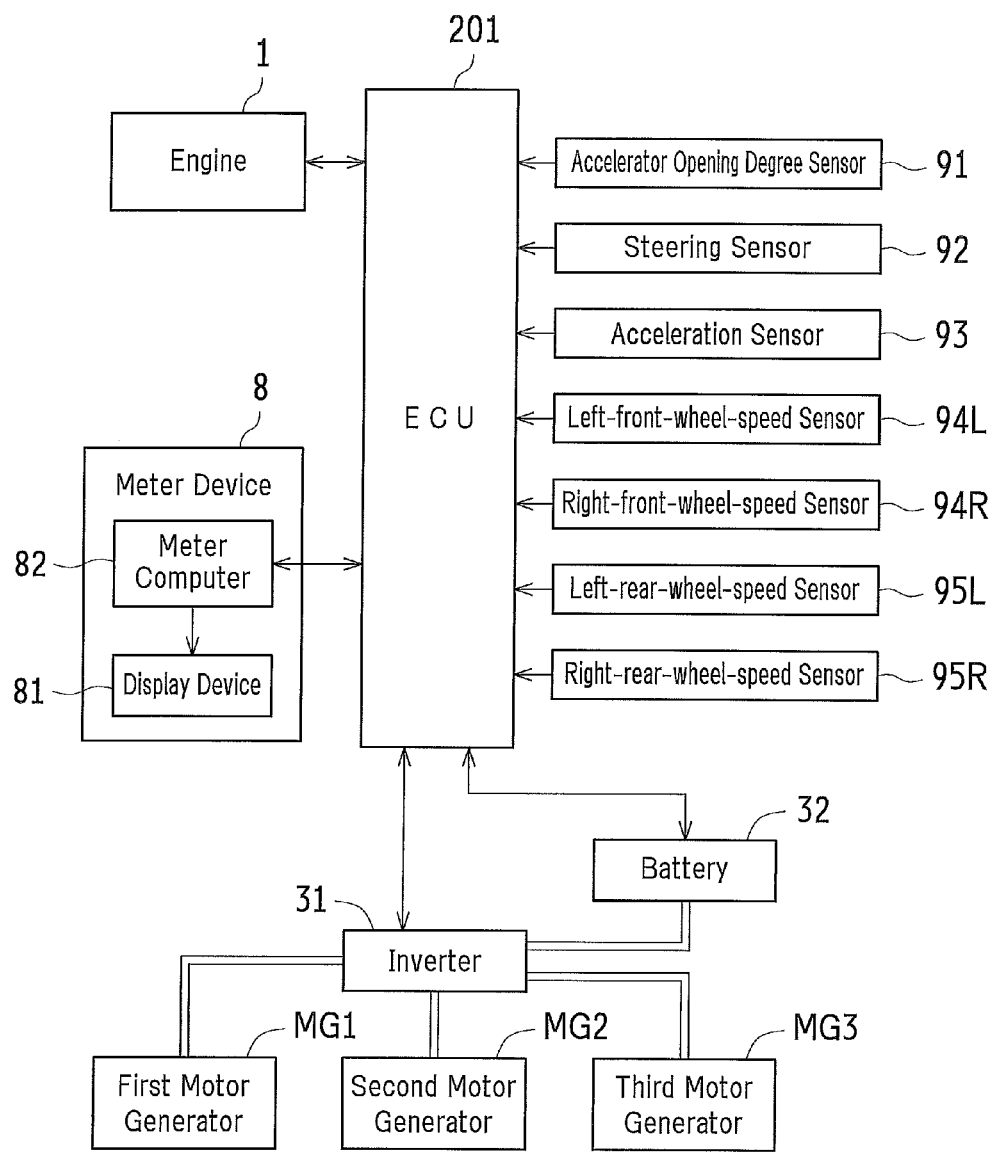
FIG. 15 is a block diagram schematically representing the structure of a control system for the vehicle shown in FIG. 14.

FIG. 14 is a schematic diagram representing a power transmission system for a vehicle in accordance with a second embodiment of the present invention. FIG. 15 is a block diagram schematically representing the structure of a control system for the vehicle shown in FIG. 14. Next will be described an overall structure of a vehicle 200 in accordance with the second embodiment of the present invention in reference to FIGS. 14 and 15. For convenience, those members of the second embodiment that are the same as members of the first embodiment are indicated by the same reference numerals and description thereof is omitted.

The vehicle 200 is a hybrid vehicle including an engine 1 and first to third motor generators MG1 to MG3 as its travel driving force sources and is capable of switching between two-wheel drive state where only front wheels 43L and 43R are driven and four-wheel drive state where all front wheels 43L and 43R and rear wheels 73L and 73R are driven.

As illustrated in FIG. 14, the vehicle 200 includes a front-wheel drive system that drives the front wheels 43L and 43R, a rear-wheel drive system that drives the rear wheels 73L and 73R, a meter device 8, and an ECU 201.

Front-Wheel Drive System

The front-wheel drive system includes the engine (internal combustion engine) 1 that generates travel driving force, the first motor generator MG1 that primarily functions as an electric power generator, the second motor generator MG2 that primarily functions as an electric motor, a power division mechanism 11, a reduction mechanism 12, a front-wheel decelerator 13, a front-wheel differential device 41, a front-wheel shaft 42, and the front wheels 43L and 43R.

Engine

The output of the engine 1 is transmitted to an input shaft 11a via a crankshaft 1a and a damper 14. The damper 14 is, for example, a transaxle damper of a coil spring type and absorbs torque variations of the engine 1.

Motor Generator

The first motor generator MG1 is an AC synchronous power generator including a rotor MG1R and a stator MG1S. The rotor MG1R is composed of a permanent magnet(s) supported so as to rotate freely around the input shaft 11a. The stator MG1S has three-phase windings wound around it. The first motor generator MG1 functions both as an electric power generator and as an electric motor. The second motor generator MG2 is an AC synchronous motor including a rotor MG2R and a stator MG2S. The rotor MG2R is composed of a permanent magnet(s) supported so as to rotate freely around the input shaft 11a. The stator MG2S has three-phase windings wound around it. The second motor generator MG2 functions both as an electric motor and as an electric power generator.

As illustrated in FIG. 15, the first motor generator MG1 and the second motor generator MG2 are connected to a battery (electric storage device) 32 via an inverter 31. The inverter 31 is controlled by the ECU 201. In conjunction with this control of the inverter 31, the first motor generator MG1 and the second motor generator MG2 are switched between regenerative mode and travel (assist) mode. Regenerated power is fed to the battery 32 via the inverter 31 to charge the battery 32. The electric power that drives the first motor generator MG1 and the second motor generator MG2 is supplied from the battery 32 via the inverter 31.

Power Division Mechanism

As illustrated in FIG. 14, the power division mechanism 11 is composed of a planetary gear mechanism that includes a sun gear 11S, pinion gears 11P, a ring gear 11R, and a planetary carrier 11CA. The sun gear 11S is an external gear that rotates at the center of the gear elements. The pinion gears 11P is an external gear that revolves around the sun gear 11S and rotates in external contact with the sun gear 11S. The ring gear 11R is an annular internal gear with an open center that meshes with the pinion gears 11P. The planetary carrier 11CA supports the pinion gears 11P and rotates with the revolving pinion gears 11P. The planetary carrier 11CA is coupled to the input shaft 11a leading from the engine 1 in such a manner that the planetary carrier 11CA can rotate integrally with the input shaft 11a. The sun gear 11S is coupled to the rotor MG1R of the first motor generator MG1 in such a manner that the sun gear 11S can rotate integrally with the rotor MG1R.

Reduction Mechanism

The reduction mechanism 12 is composed of a planetary gear mechanism that includes a sun gear 12S, pinion gears 12P, and a ring gear 12R. The sun gear 12S is an external gear that rotates at the center of the gear elements. The pinion gears 12P is an external gear that is supported by a carrier (transaxle case) 12CA so as to rotate freely and rotates in external contact with the sun gear 12S. The ring gear 12R is an annular internal gear with an open center that meshes with the pinion gears 12P. The ring gear 12R of the reduction mechanism 12, the ring gear 11R of the power division mechanism 11, and a counter drive gear 13a are provided integrally. The sun gear 12S is coupled to the rotor MG2R of the second motor generator MG2 in such a manner that the sun gear 12S can rotate integrally with the rotor MG2R.

Driving force from either one or both of the engine 1 and the second motor generator MG2 is transmitted to the left and right front wheels 43L and 43R via the counter drive gear 13a, a counter driven gear 13b, a final gear 13c, the front-wheel differential device 41, and the front-wheel shaft 42. The counter drive gear 13a, the counter driven gear 13b, and the final gear 13c constitute the front-wheel decelerator 13.

Rear-Wheel Drive System

The rear-wheel drive system includes the third motor generator MG3, a rear-wheel decelerator 21, a rear-wheel differential device 71, a rear-wheel shaft 72, and the rear wheels 73L and 73R. The third motor generator MG3 primarily functions as an electric motor.

The third motor generator MG3 is an AC synchronous motor including a rotor MG3R and a stator MG3S. The rotor MG3R is composed of a permanent magnet(s). The stator MG3S has three-phase windings wound around it. The third motor generator MG3 functions both as an electric motor and as an electric power generator.

As illustrated in FIG. 15, the third motor generator MG3 is connected to the battery (electric storage device) 32 via the inverter 31. The inverter 31 is controlled by the ECU 201. In conjunction with this control of the inverter 31, the third motor generator MG3 is switched between regenerative mode and travel (assist) mode. Regenerated power is fed to the battery 32 via the inverter 31 to charge the battery 32. The electric power that drives the third motor generator MG3 is supplied from the battery 32 via the inverter 31.

As illustrated in FIG. 14, driving force from the third motor generator MG3 is transmitted to the left and right rear wheels 73L and 73R via a counter drive gear 21a, a counter driven gear 21b, a final gear 21c, the rear-wheel differential device 71, and the rear-wheel shaft 72. The counter drive gear 21a, the counter driven gear 21b, and the final gear 21c constitute the rear-wheel decelerator 21.

ECU

The ECU 201 controls, to name a few examples, the operation of the engine 1, the driving of the first to third motor generators MG1 to MG3, and the cooperative operation of the engine 1 and the first to third motor generators MG1 to MG3, so as to control traveling motion of the vehicle 200.

Furthermore, the ECU 201 is capable of communications with the meter device 8 that displays (indicates) various information so that the ECU 201 can send various display requests to the meter device 8. Specifically, the ECU 201 is capable of implementing a turn-on control process for the indicators Pf and Pr similarly to the ECU 10 (see FIG. 2) of the first embodiment.

The second embodiment is otherwise configured in the same manner as the first embodiment. The second embodiment achieves the same effects as the first embodiment.

Other Embodiments

The embodiments disclosed herein are for illustrative purposes only in every respect and should not be subjected to any restrictive interpretations. The scope of the present invention is defined only by the claims and never bound by the embodiments. Those modifications and variations that may lead to equivalents of claimed elements are all included within the scope of the invention.

For example, the first and second embodiments described examples where the present invention is applied to a vehicle that employs a standby four-wheel drive system based on an FF layout. These examples are by no means intended to be limiting the invention. Alternatively, the present invention may be applied to a vehicle (conventional vehicle or hybrid vehicle) that employs a standby four-wheel drive system based on an FR (front-engine, rear-wheel drive) layout. In this alternative application, the rear wheels are examples of the "primary drive wheel" of the present invention, and the front wheels are examples of the "secondary drive wheel" of the present invention.

The first and second embodiments described examples where the ECU 10 or 201 implements a turn-on control process for the indicators Pf and Pr and outputs a turn-on request to the meter device 8. These examples are by no means intended to be limiting the invention. Alternatively, the meter device may implement an indicator-turn-on control process and display results on the torque indicator screen. In this alternative application, for example, the meter device may obtain the front- and rear-wheel sum torque Tin and the rear-wheel torque Tout from the ECU.

The first and second embodiments described examples where each indicator Pf and Pr has five segments. These examples are by no means intended to be limiting the invention. Alternatively, each indicator Pf and Pr may have any number of segments.

The first and second embodiments described examples where the indicators Pf and Pr have the same number of segments. These examples are by no means intended to be limiting the invention. Alternatively, the indicators Pf may have more segments than the indicators Pr.

The first and second embodiments described examples where the threshold values Pd, Tr2, Tr3, Tr4, and Tr5 and maximum value Tr6 of the rear-wheel-map-referencing torque Trm are set equal to the threshold values Tf1, Tf2, Tf3, Tf4, and Tf5 and maximum value Tf6 of the front-wheel-map-referencing torque Tfm respectively. These examples are by no means intended to be limiting the invention. Alternatively, the threshold value of the rear-wheel-map-referencing torque may differ from the threshold value of the front-wheel-map-referencing torque.

The variation example of the first embodiment described an example where the number of ON segments in the indicators Pr is prohibited from exceeding the number of ON segments in the indicators Pf. This example is by no means intended to be limiting the invention. Alternatively, the number of ON segments in the indicators Pf may be prohibited from falling below the number of ON segments in the indicators Pr. Alternatively, the minimum value of the number of ON segments in the indicators Pf may be controlled to be greater than or equal to the number of ON segments in the indicators Pr.

The first and second embodiments described examples where there is provided a single ECU. These examples are by no means intended to be limiting the invention. Alternatively, there may be provided more than one ECU.

INDUSTRIAL APPLICABILITY

The present invention is applicable to torque indicating devices that indicate torques placed on primary drive wheels and secondary drive wheels and to vehicles including such a torque indicating device.

REFERENCE SIGNS LIST

8 Meter Device (Torque Indicating Device)
43L, 43R Front Wheel (Primary Drive Wheel)
73L, 73R Rear Wheel (Secondary Drive Wheel)
100, 200 Vehicle
Pf Indicator (First Indicating Section)
Pr Indicator (Second Indicating Section)

The invention claimed is:

1. A torque indicating device, comprising:
a first indicating section that indicates a torque transmitted to a primary drive wheel of a vehicle; and
a second indicating section that indicates a torque transmitted to a secondary drive wheel of the vehicle,
wherein:
the second indicating section indicates a quantity that is less than or equal to a quantity indicated by the first indicating section;
the quantity indicated by the first indicating section is varied with a variation in the torque transmitted to the primary drive wheel;
the quantity indicated by the second indicating section is varied with a variation in the torque transmitted to the secondary drive wheel; and
the quantity indicated by the second indicating section has an upper limit that is, when either one or both of the quantity indicated by the first indicating section and the quantity indicated by the second indicating section is/are to be varied, controlled not to exceed the quantity indicated by the first indicating section, so that the quantity indicated by the second indicating section is less than or equal to the quantity indicated by the first indicating section.

2. A torque indicating device, comprising:
a first indicating section that indicates a torque transmitted to a primary drive wheel of a vehicle; and
a second indicating section that indicates a torque transmitted to a secondary drive wheel of the vehicle,
wherein:
the second indicating section indicates a quantity that is less than or equal to a quantity indicated by the first indicating section;
the quantity indicated by the first indicating section is varied with a variation in the torque transmitted to the primary drive wheel;
the quantity indicated by the second indicating section is varied with a variation in the torque transmitted to the secondary drive wheel; and
when either one or both of the quantity indicated by the first indicating section and the quantity indicated by the second indicating section is/are to be varied, control is performed to prohibit the quantity indicated by the second indicating section from exceeding the quantity indicated by the first indicating section, so that the quantity indicated by the second indicating section is less than or equal to the quantity indicated by the first indicating section.

3. A torque indicating device, comprising:
a first indicating section that indicates a torque transmitted to a primary drive wheel of a vehicle; and
a second indicating section that indicates a torque transmitted to a secondary drive wheel of the vehicle,
wherein:
the second indicating section indicates a quantity that is less than or equal to a quantity indicated by the first indicating section;

the quantity indicated by the first indicating section is derived from a ratio of the torque on the primary drive wheel to a total torque that is a sum of the torque on the primary drive wheel and the torque on the secondary drive wheel, and the quantity indicated by the second indicating section is derived from a ratio of the torque on the secondary drive wheel to the total torque;

the ratio of the torque on the primary drive wheel to the total torque and the ratio of the torque on the secondary drive wheel to the total torque each have a maximum value that is set to 0.5, and a map-referencing criterion torque is calculated from the torque on the secondary drive wheel;

a primary-drive-wheel-map-referencing torque is calculated from the ratio of the torque on the primary drive wheel to the total torque and the map-referencing criterion torque, and the quantity indicated by the first indicating section is derived using the primary-drive-wheel-map-referencing torque; and a secondary-drive-wheel-map-referencing torque is calculated from the ratio of the torque on the secondary drive wheel to the total torque and the map-referencing criterion torque, and the quantity indicated by the second indicating section is derived using the secondary-drive-wheel-map-referencing torque.

4. A vehicle, comprising the torque indicating device as set forth in claim 1.

* * * * *